United States Patent
Juan

(10) Patent No.: US 6,651,790 B2
(45) Date of Patent: Nov. 25, 2003

(54) HYDRAULIC BALANCED BRAKING SYSTEM

(76) Inventor: Chih-Chen Juan, No. 278, Lan Tan, Tung-Yang Hsin-Chun Chiayi City (TW)

( * ) Notice: Subject to any disclaimer, the term of this patent is extended or adjusted under 35 U.S.C. 154(b) by 0 days.

(21) Appl. No.: 10/135,759

(22) Filed: Apr. 29, 2002

(65) Prior Publication Data

US 2003/0201667 A1 Oct. 30, 2003

(51) Int. Cl.$^7$ .................................................. B62L 3/00
(52) U.S. Cl. ................ 188/344; 188/24.11; 188/151 A; 303/6.01; 303/9.61; 303/84.2
(58) Field of Search ............................... 303/9.61, 84.1, 303/84.2, DIG. 1, 9.64, 9.63, 6.01; 188/345, 354, 16, 344, 24.22, 72.4, 204 R, 151 A, 152, 24.11, 24.12; 60/581, 582

(56) References Cited

U.S. PATENT DOCUMENTS

| | | | | |
|---|---|---|---|---|
| 2,968,153 A | * | 1/1961 | Hackett | |
| 3,640,067 A | * | 2/1972 | Ingram | |
| 3,883,189 A | * | 5/1975 | Braun | 188/151 A |
| 4,402,478 A | * | 9/1983 | Martin | 303/6.05 |
| 4,505,519 A | * | 3/1985 | Muterel | |
| 6,186,282 B1 | * | 2/2001 | Juan | |
| 6,193,030 B1 | * | 2/2001 | Kuo | 188/344 |
| 6,311,805 B1 | * | 11/2001 | Juan | |
| 6,364,044 B1 | * | 4/2002 | Juan | |

* cited by examiner

Primary Examiner—Douglas C. Butler
(74) Attorney, Agent, or Firm—Pro-Techtor International Services

(57) ABSTRACT

A hydraulic balanced braking system, comprising two oil pressure cylinders, two hydraulic brakes, and an oil-pressure balance unit. The two oil pressure cylinders are mounted close to braking handles. The oil-pressure balance unit is inserted between the two oil pressure cylinders and the two hydraulic brakes and further comprises two parallelly oriented oil cylinders, two primary pistons, two secondary pistons, and a connecting plate. Two inlets at upper sides of the two oil cylinders are connected with the two oil pressure cylinders, respectively, transmitting oil pressure from the two oil pressure cylinders to the two primary pistons. The two secondary pistons are mounted below and driven downward by the two primary pistons, respectively, thus generating oil pressure and via two outlets driving a braking movement of the two hydraulic brakes. The connecting plate is fastened to upper ends of the two secondary pistons, so that upon a downward movement of one of the primary pistons both of the secondary pistons are driven downward, simultaneously generating oil pressure in both of the hydraulic brakes.

4 Claims, 7 Drawing Sheets

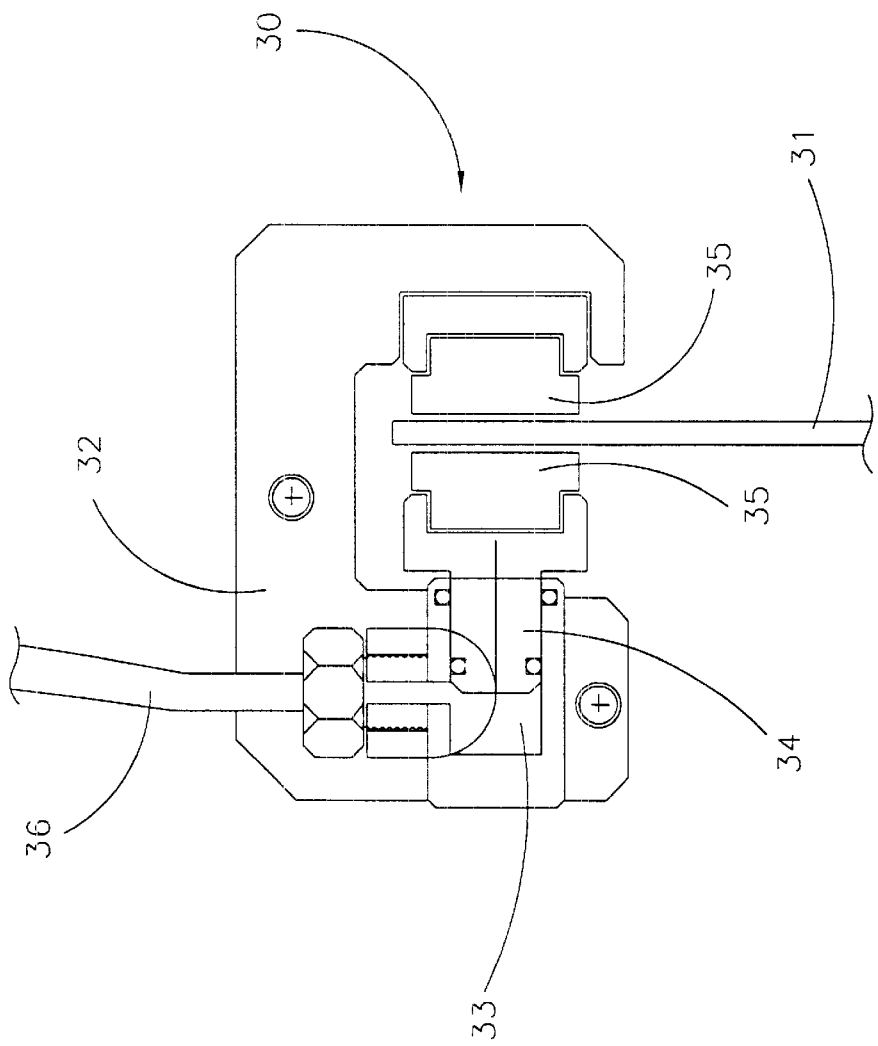

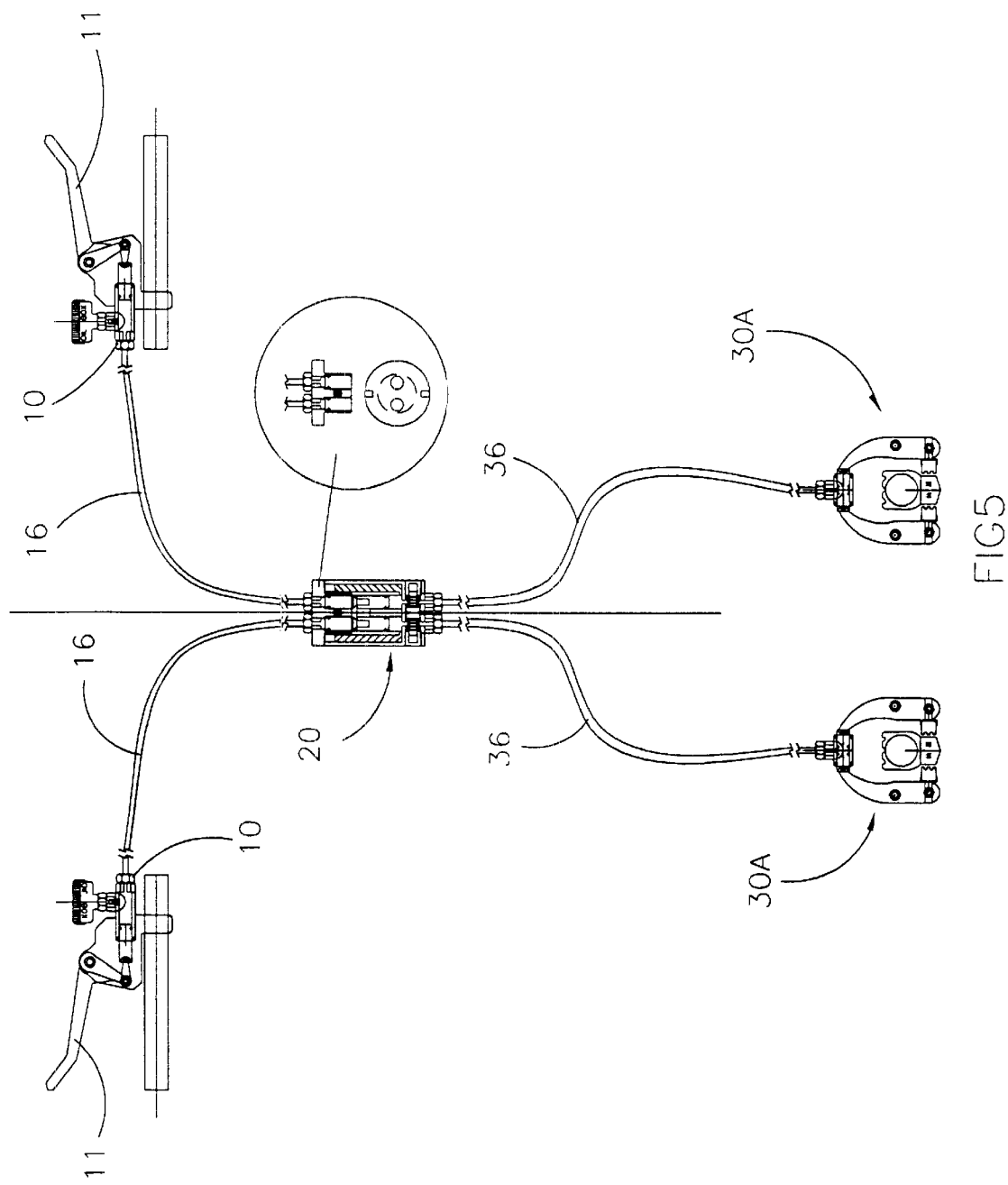

HYDRAULIC BALANCED BRAKING SYSTEM

BACKGROUND OF THE INVENTION

1. Field of the Invention

The present invention relates to a hydraulic balanced braking system, particularly to an hydraulic balanced braking system that is used in a bicycle or motorcycle.

2. Description of Related Art

Conventional braking systems for two-wheeled vehicles like bicycles or motorcycles mostly have two independent brakes for the front and rear wheels. During braking, the two brakes generally are not operated at exactly the same time.

If, during emergency braking a braking force is applied to the front wheel of a two-wheeled vehicle earlier than to the rear wheel thereof, then due to a forward-directed force, friction of the rear wheel on the ground is low, while friction of the front wheel on the ground is high, possibly leading to skidding of the vehicle. By inertia of the moving vehicle, the front part thereof sinks downward, and the vehicle becomes unstable and may even fall over.

If, on the other hand, during emergency braking a braking force is applied to the rear wheel of a two-wheeled vehicle earlier than to the front wheel thereof, then due to a forward-directed force, friction of the rear wheel on the ground is low, and an insufficient braking force is developed at the rear wheel, and there is no way to slow down the vehicle within a short time. Since the braking force on the rear wheel exceeds friction thereof against the ground, the vehicle will skid.

For these reasons, there is no way to perform stable and effective emergency braking of a two-wheeled vehicle. Due to the risks of skidding and falling over, emergency braking of a two-wheeled vehicle is dangerous.

For achieving balanced braking of both wheels of two-wheeled vehicles, synchronous braking systems for two-wheeled vehicles have appeared on the market. Conventional synchronous braking systems, however, mostly have oil pressure systems, which are complicated and thus suitable for motorcycles only, but not for bicycles. Furthermore, conventional synchronous braking systems allow only for synchronous braking, but not for braking with balanced forces.

Moreover, even with the capability of balanced braking, conventional synchronous braking systems use oil circuits for the front and rear wheels that are connected. Thus, hydraulic pressure from left and right handles is uniformly applied to the front and rear wheels. If, however, one of the oil circuits for the front and rear wheels is broken or leaks, oil pressure in the whole system drops, and any braking force is lost.

In conventional bicycles and some motorcycles, braking forces are transmitted by cables. Some bicycles have braking systems with cable transmission which have the capability of balanced braking of the front and rear wheels. However, these balanced braking systems generally employ two cables. Since the two cables synchronously operate on both wheels, the lengths thereof have to be adjusted carefully to achieve synchronous braking, and there is no way to obtain a precise balanced braking effect. Adjusting is difficult and time-consuming.

SUMMARY OF THE INVENTION

It is an object of the present invention to provide a hydraulic balanced braking system for motorcycles and bicycles with an improved braking effect.

Another object of the present invention is to provide a hydraulic balanced braking system which applies balanced uniform braking forces to front and rear wheels.

The present invention can be ore fully understood by reference to the following description and accompanying drawings.

BRIEF DESCRIPTION OF THE DRAWINGS

FIG. 4 is a sectional view of one of the hydraulic brakes of the present invention in the first embodiment.

FIG. 5 is a view of the hydraulic balanced braking system of the present invention in the second embodiment.

DETAILED DESCRIPTION OF THE PREFERRED EMBODIMENTS

Figure 1:
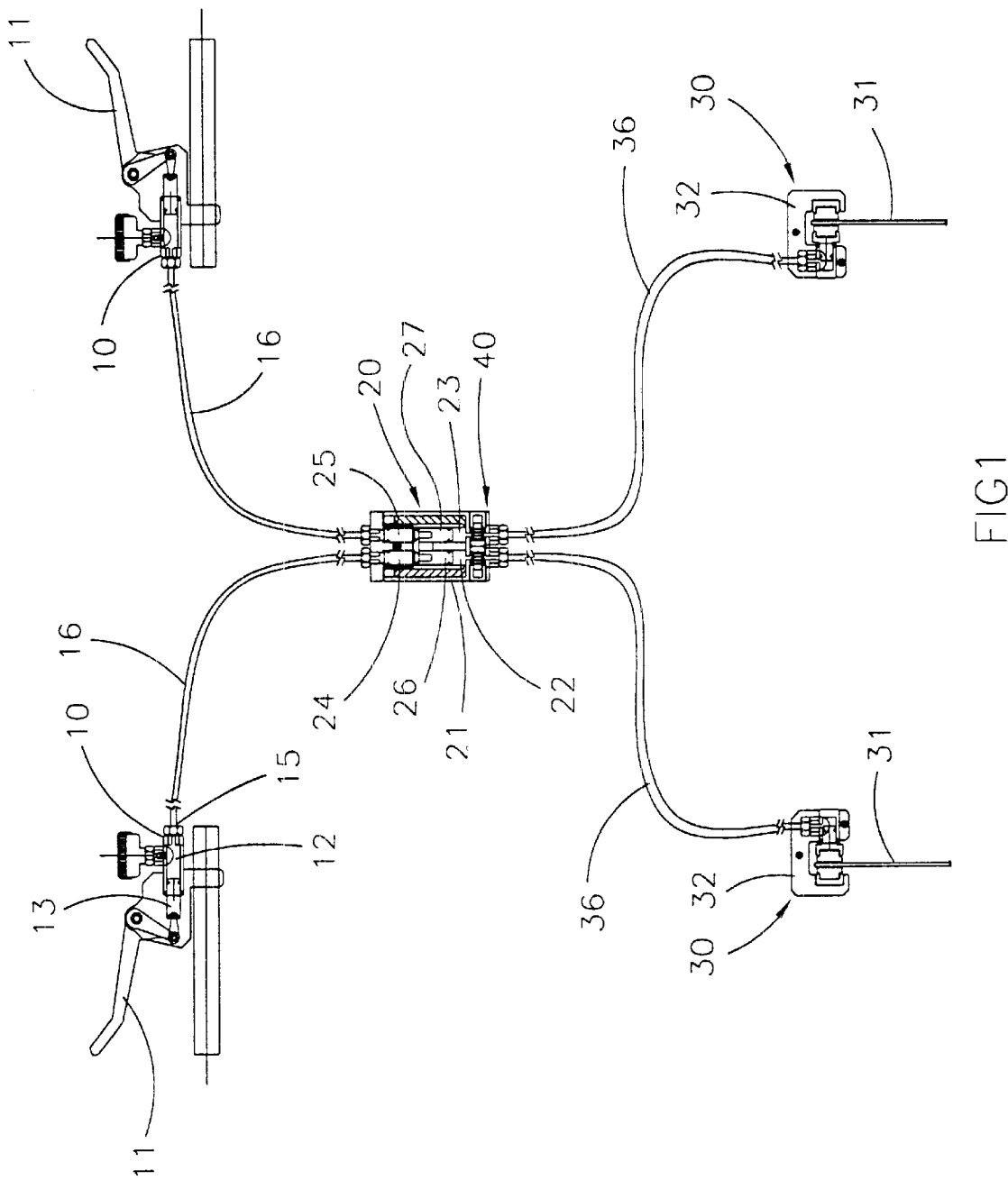
FIG. 1 is a view of the hydraulic balanced braking system of the present invention in the first embodiment.

As shown in FIG. 1, the oil-pressure balanced braking system of the present invention in a first embodiment mainly comprises: two oil pressure cylinders 10, mounted close to left and right handles 11 of a two-wheeled vehicle, with oil pressure being generated by operating the handles 11; an oil-pressure balance unit 20, connected with the two oil pressure cylinders 10 and driven thereby; and two hydraulic brakes 30, connected with the oil-pressure balance unit 20 and operated by oil pressure therein.

Referring to FIG. 1, each of the oil pressure cylinders 10 has a middle part with a chamber 12 and a piston 13 which is inserted into the chamber 12 from a first end thereof. The piston 13 is driven by one of the handles 11, gliding within the chamber 12. Each of the oil pressure cylinders 10 further has an outlet 15 at a second end opposite to the first end. For each of the oil pressure cylinders 10, a transmission tube 16 connects the outlet 15 with the oil-pressure balance unit 20. When the piston 13 moves, oil in the chamber 12 is compressed, and pressure thereof is transmitted through oil in the transmission tube 16 to the oil-pressure balance unit 20.

The oil-pressure balance unit 20, undergoing pressure input from the oil pressure cylinders 10, drives the two hydraulic brakes 30 to perform braking with automatically balanced forces. If only one of the oil pressure cylinders 10 is driven, the oil-pressure balance unit 20 still drives both of the hydraulic brakes 30 simultaneously.

Figure 2:
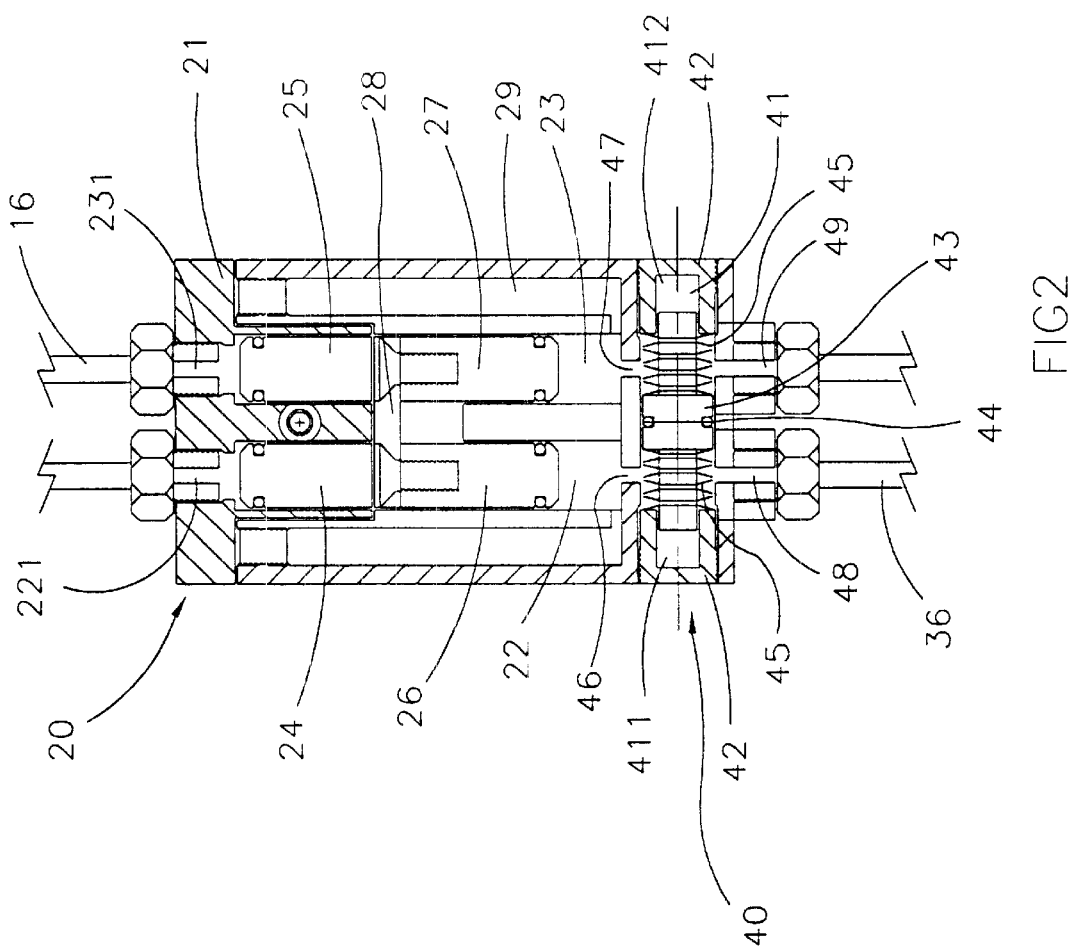
FIG. 2 is a sectional view of the oil-pressure balance unit of the present invention.

Referring to FIG. 2, the oil-pressure balance unit 20 comprises: a main body 21, containing a left oil cylinder 22 and, parallel thereto, a right oil cylinder 23 and two primary pistons 24, 25, gliding in upper parts of the left and right oil cylinders 22, 23, respectively; and two pressure inlets 221, 231 on upper ends of the left and right oil cylinders 22, 23, respectively, connected with the transmission tubes 16, so that oil pressure from the oil pressure cylinders 10 enters the left and right oil cylinders 22, 23, driving the primary pistons 24, 25 downward.

Referring again to FIG. 2, two secondary pistons 26, 27 are inserted in lower parts of the left and right oil cylinders 22, 23, respectively, being pushed by the primary pistons 24, 25. Thus oil at lower ends of the oil cylinders 22, 23 is compressed. A connecting plate 28 is fastened on upper ends of the secondary pistons 26, 27 by bolts. Thus any of the primary pistons 24, 25 drives both of the secondary pistons 26, 27. If only one of the handles 11 is operated and consequently only one of the oil pressure cylinders 10 exerts oil pressure, both of the secondary pistons 26, 27 move, taking along each other, so that both of the hydraulic brakes 30 are operated simultaneously. Two oil storage chambers 29 are placed on two lateral sides of the main body 21, being connected with the lower parts of the left and right oil cylinders 22, 23, respectively, for storing oil.

Figure 3A:
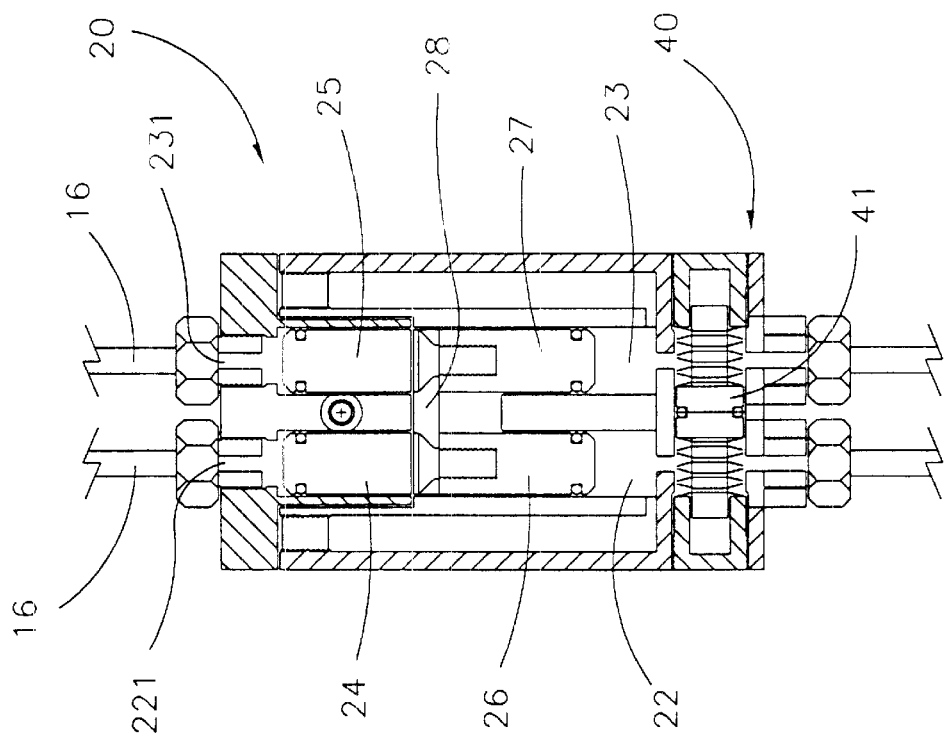
FIGS. 3A, 3B, 3C and 3D are schematic illustrations of the movement of the oil-pressure balance unit of the present invention.
Figure 3B:
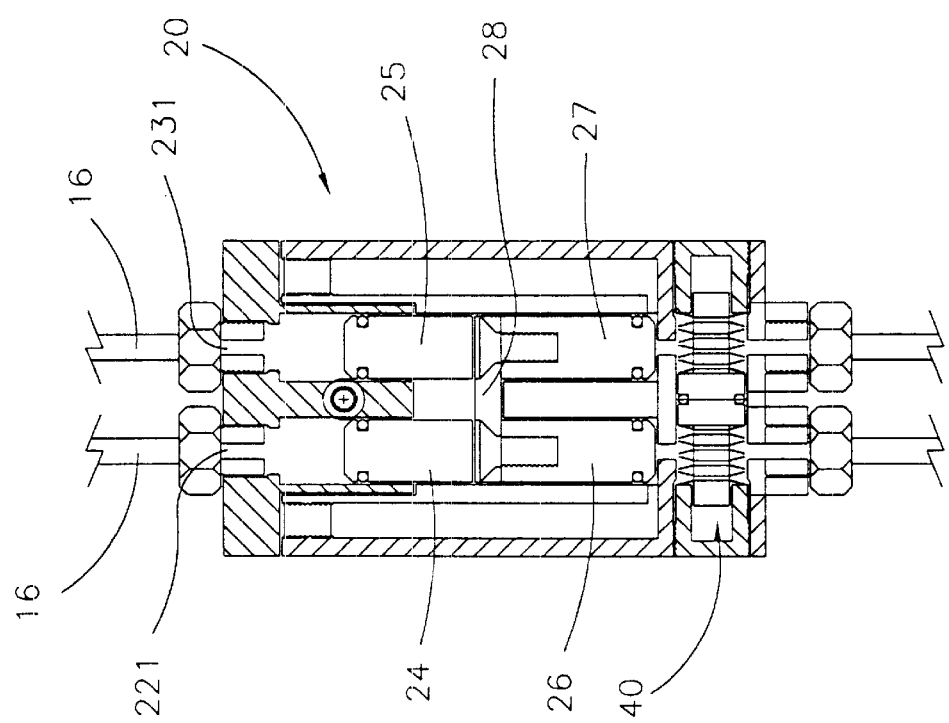

FIGS. 3A–3D illustrate the movement of the oil-pressure balance unit 20 during braking. As shown in FIG. 3A, as long as the handles 11 have not been operated, the secondary pistons 26, 27 and the primary pistons 24, 25 receive counterpressure from the hydraulic brakes 30 and are pushed to uppermost positions inside the left and right oil cylinders 22, 23, respectively. As shown in FIG. 3B, when both of the handles 11 are operated, the primary pistons 24, 25 move downward, pushing the secondary pistons 26, 27 downward, exerting pressure on the hydraulic brakes 30, so that braking is performed.

Figure 3C:
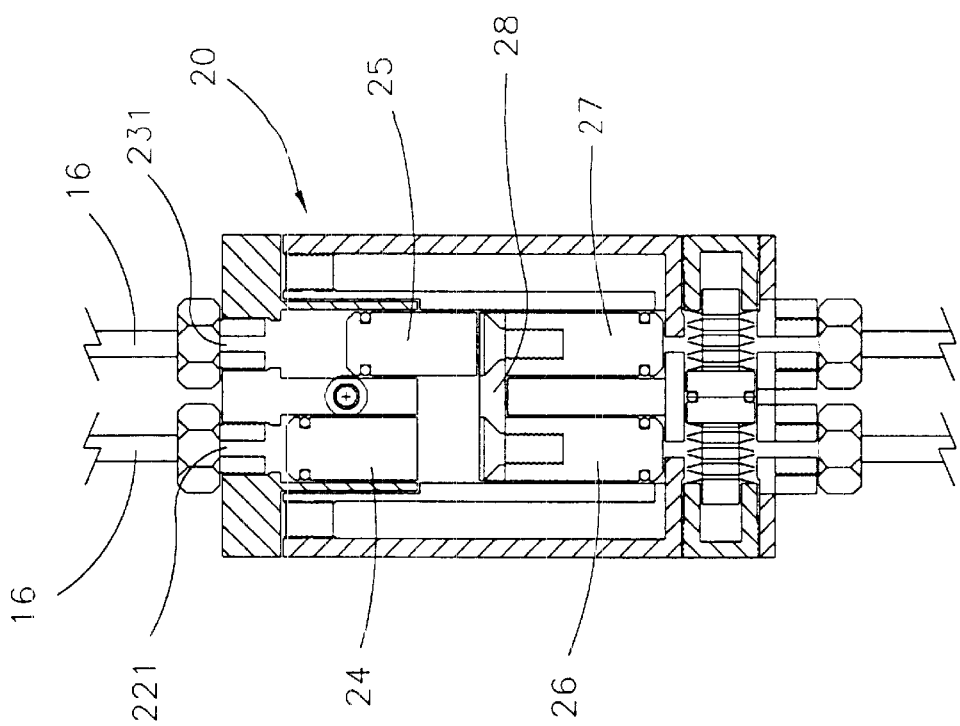
Figure 3D:
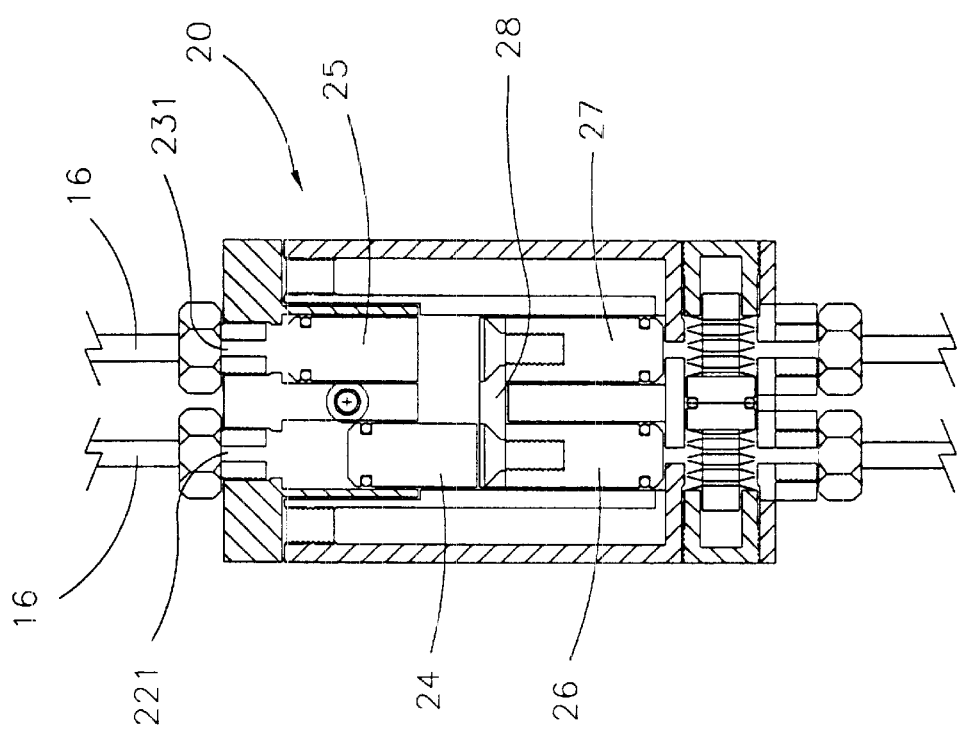

As shown in FIGS. 3C and 3D, when just one of the handles 11 is operated, one of the primary pistons 24, 25 is driven downward. Even with only one of the oil pressure cylinders 10 exerting pressure, the connecting plate 28 is pushed downward, taking along both of the secondary pistons 26, 27. Due to an exchange of pressure in the oil-pressure balance unit 20, the hydraulic brakes 30 are operated simultaneously, even upon asymmetric operation of the handles 11.

Referring to FIG. 4, in a first embodiment of the present invention, the hydraulic brakes 30 are disk brakes, each comprising: a brake disk 31; a caliper 32, straddling the brake disk 31; a brake cylinder 33; a brake shoe 34, inserted into the brake cylinder 33 and placed on one side of the brake disk 31; two friction pads 35, attached to the brake shoe 34 and an inner side of the caliper 32 and effecting braking by being pressed against the brake disk 31; and a transmission tube 36, connected with the oil-pressure balance unit 20 and transmitting pressure therefrom.

The main characteristic of the oil-pressure balance unit 20 of the present invention is a balancing device 40. The balancing device 40 ensures automatically balanced oil pressure to be exerted by the secondary pistons 26, 27 on the hydraulic brakes 30, so that the brake disks 31 of the hydraulic brakes 30 are gripped in a balanced way. If one of the hydraulic brakes 30 has a leaking oil circuit, so that pressure is lost, regular braking is still performed by the other of the hydraulic brakes 30.

Referring again to FIG. 2, the balancing device 40 comprises: a horizontal cylinder 41, extending over the lower ends of the left and right oil cylinders 22, 23, two plugs 42, inserted into two ends of the horizontal cylinder 41, sealing the horizontal cylinder 41; a separator plate 43, glidingly movable inside the horizontal cylinder 41; a sealing ring 44, mounted on the separator plate 43, sealing the separator plate 43 against the horizontal cylinder 41; two springs 45, inserted between opposite sides of the separator plate 43 and the plugs 42 and pushing the separator plate 43 in a rest state into a middle position inside the horizontal cylinder 41; two inlets 46, 47 at the lower ends of the left and right oil cylinders 22, 23, respectively, transmitting oil pressure exerted by the secondary pistons 26, 27 into the horizontal cylinder 41; and two outlets 48, 49 at a lower side of the horizontal cylinder, which are via the transmission tubes 36 connected with the hydraulic brakes 30.

As further shown in FIG. 2, the separator plate 43 has an outer diameter that is equal to the inner diameter of the horizontal cylinder 41, thus being sealed against the horizontal cylinder 41. Thus the horizontal cylinder 41 has an inner space divided into left and right pressure chambers 411, 412. The separator plate 43 is placed between the inlets 46, 47, so that oil pressure in the left and right oil cylinders 22, 23 is respectively led into the left and right pressure chambers 411, 412. Furthermore, the outlets 48, 49 are placed to both sides of the separator plate 43. Thus oil pressure in the left and right oil cylinders 22, 23 is through the outlets 48, 49 respectively transmitted to both of the hydraulic brakes 30.

The separator plate 43 ensures that any difference of pressures at the hydraulic brakes 30 is compensated, so that the object of braking with balanced forces on both of the hydraulic brakes 30 is achieved. If during braking the brake disk 31 of one of the hydraulic brakes 30 is gripped first, the brake shoe 34 is blocked from moving further, so that pressure in the brake cylinder 33 rises, being via the transmission tube 36 led back to the horizontal cylinder 41. At this moment, pressure the left and right pressure chambers 411, 412 is nonuniform, causing the separator plate 43 to move in the direction of lower pressure, until uniform pressure in the horizontal cylinder 41 is established.

Therefore, if the friction pads 35 of one of the hydraulic brakes 30 touches the brake disk 31 thereof, while the friction pads 35 of the other of the hydraulic brakes 30 has no contact with the brake disk 31 thereof, the balancing device 40 balances braking forces on both of the hydraulic brakes 30, until the brake disks 31 of both of the hydraulic brakes 30 are touched. Only then braking pressure rises further, with balanced braking being performed.

Furthermore, if the oil circuit to one of the hydraulic brakes 30 is broken or leaks, with oil pressure dropping, oil pressure in the other of the hydraulic brakes 30 will remain stable, since the separator plate 43 in the horizontal cylinder 41 separates the oil circuits of the two hydraulic brakes 30. Thus, with one oil circuit leaking, braking using one of the hydraulic brakes 30 is still possible.

Figure 6:
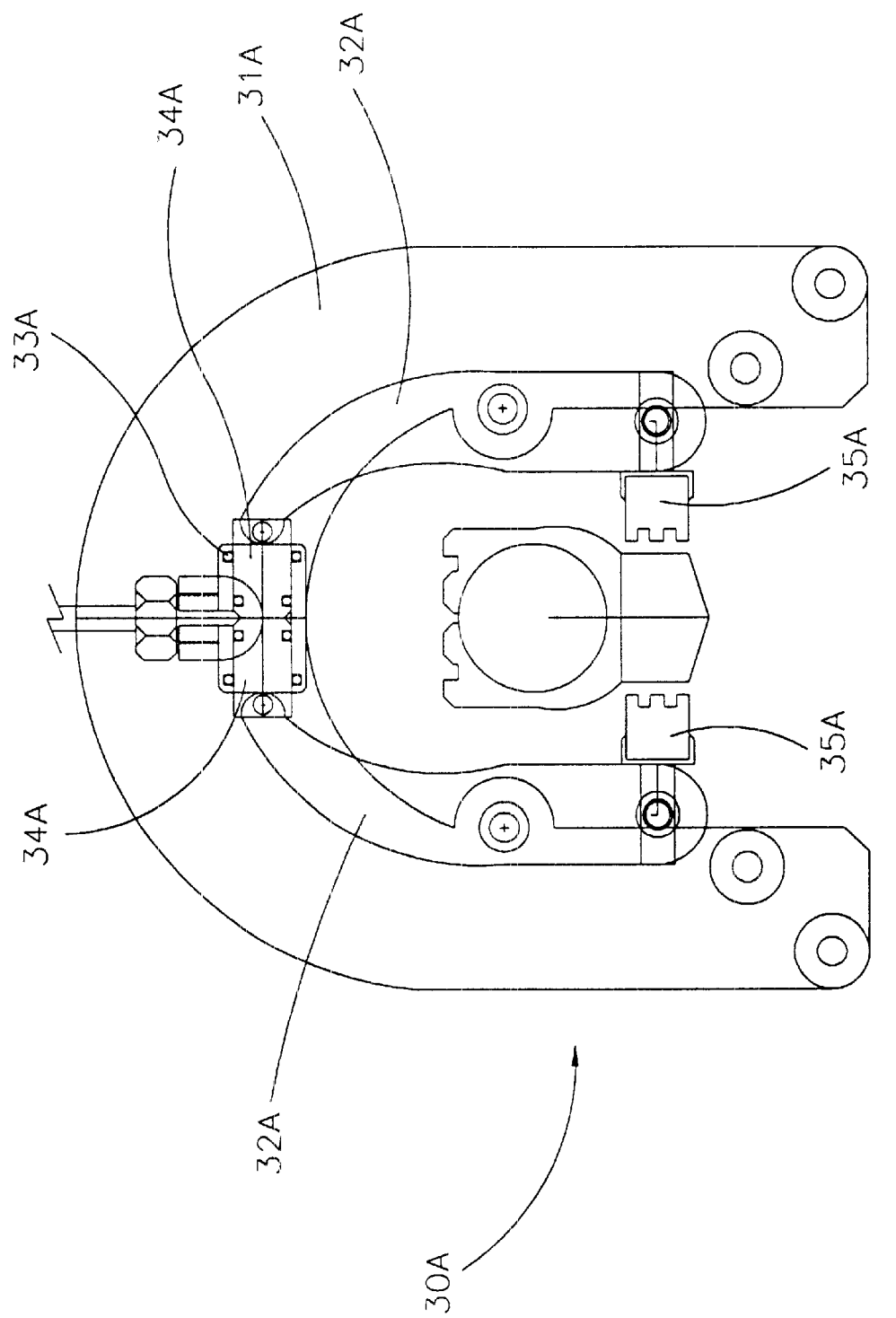
FIG. 6 is a sectional view of one of the hydraulic brakes of the present invention in the second embodiment.

As shown in FIGS. 5 and 6, the present invention in a second embodiment has hydraulic brakes 30A that are rim brakes. Each of the hydraulic brakes 30A comprises: a brake frame 31A; two caliper arms 32A, hingedly mounted on the brake frame 31A; a brake cylinder 33A, mounted on the brake frame 31A close to upper ends of the two caliper arms 32A; two brake pistons 34A, inserted in the brake cylinder 33A and at outer ends connected with the two caliper arms 32A, pushing the upper ends of the two caliper arms 32A outward; and two friction pads 35A, mounted on lower ends of the two caliper arms 32A and, when the two caliper arms 32A are driven by pressure in the brake cylinder, gripping a wheel rim.

While the invention has been described with reference to preferred embodiments thereof, it is to be understood that modifications or variations may be easily made without departing from the spirit of this invention which is defined by the appended claims.

What is claimed is:

1. A hydraulic balanced braking system comprising:
   two oil pressure cylinders;
   two hydraulic brakes driven by said two oil pressure cylinders to perform a braking movement;
   an oil-pressure balance unit situated between and connected with said two oil pressure cylinders and said two hydraulic brakes, said oil-pressure balance unit further comprising a main body, two parallel oil cylinders, lower ends of said oil cylinders each being connected to a corresponding one of said hydraulic brakes, an inlet at an upper end of each of said two oil cylinders, said inlets are each in communication with a corresponding one of said two oil pressure cylinders, two primary pistons inside said two oil cylinders, said primary pistons are driven by oil pressure from said two oil pressure cylinders to perform a downward movement, two secondary pistons inside said two oil cylinders, said secondary pistons are mounted below said two primary pistons and are driven downward by said two primary pistons, thus generating oil pressure and driving said braking movement of said two hydraulic brakes, a connecting plate fastened to upper ends of said two secondary pistons, so that upon a downward movement of one of said primary pistons, both of said secondary pistons are driven downward, simultaneously generating oil pressure.

2. A hydraulic braking system according to claim 1, further comprising a balancing device for automatic balancing of oil pressure in said two hydraulic brakes, said balancing device further comprising;

a horizontal cylinder placed below said two oil cylinders and having two inlets that are connected to outlets of said two oil cylinders, two outlets connected to said two hydraulic brakes, a separator plate inserted in said horizontal cylinder and glidingly movable in a horizontal direction while being sealed against said horizontal cylinder, so that two separate inner spaces are formed therein, said inner spaces are connected to said two inlets and said two outlets of said horizontal cylinder, and two springs on opposite sides of said separator plate, said springs pushing said separator plate in a rest state into a middle horizontal position.

3. A hydraulic braking system according to claim 1, wherein each of said hydraulic brakes comprises:

a brake disk fixed on a common axis with a wheel, a brake frame having a brake cylinder and a brake shoe, said brake frame is inserted in said brake cylinder, and two friction pads on two sides of said brake disk, one of said two friction pads being driven by said brake shoe against brake disk, so that said braking movement is performed.

4. A hydraulic braking system according to claim 1, wherein each of said hydraulic brakes comprises:

a brake frame having two caliper arms hingedly mounted on said brake frame, two friction pads mounted on lower ends of said two caliper arms, a brake cylinder having two outward oriented brake pistons which are connected with said two caliper arms, said brake cylinder pushing said two caliper arms outward to perform said braking movement.

\* \* \* \* \*